(12) United States Patent  (10) Patent No.: US 9,123,321 B2
Alderson et al.  (45) Date of Patent: *Sep. 1, 2015

(54) SEQUENCED ADAPTATION OF ANTI-NOISE GENERATOR RESPONSE AND SECONDARY PATH RESPONSE IN AN ADAPTIVE NOISE CANCELING SYSTEM

(71) Applicant: Cirrus Logic, Inc., Austin, TX (US)

(72) Inventors: Jeffrey Alderson, Austin, TX (US); Jon D. Hendrix, Wimberly, TX (US); Dayong Zhou, Austin, TX (US); Antonio John Miller, Austin, TX (US); Chin Yong, Austin, TX (US); Gautham Devendra Kamath, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 421 days.

This patent is subject to a terminal disclaimer.

(21) Appl. No.: 13/727,718

(22) Filed: Dec. 27, 2012

(65) Prior Publication Data

US 2013/0301847 A1 Nov. 14, 2013

Related U.S. Application Data

(60) Provisional application No. 61/645,333, filed on May 10, 2012.

(51) Int. Cl.
*G01K 11/16* (2006.01)
*G10K 11/16* (2006.01)
(Continued)

(52) U.S. Cl.
CPC .............. *G10K 11/16* (2013.01); *G10K 11/178* (2013.01); *G10K 11/1784* (2013.01);
(Continued)

(58) Field of Classification Search
CPC .............. G10K 2210/3226; G10K 2210/3014; G10K 2210/3017; G10K 2210/3022; G10K 2210/3023; G10K 2210/30391; G10K 11/178; G10K 11/1784; H04R 1/1083; H04M 9/082; H04B 3/20; H04B 3/21; H04B 3/23; H04B 3/234; H04B 3/237; H04B 3/238; G10L 21/02; G10L 21/0208; G10L 2021/02082; G10L 2021/02161; G10L 2021/02165; G10L 2021/02168; G10L 25/84; G10L 2025/783; G10L 2025/786
USPC ........ 381/71.1, 71.11, 71.12, 71.14; 455/570; 379/406.08, 406.15, 406.13, 406.09, 379/392; 704/219, 226, 227, 203, 201; 708/322
See application file for complete search history.

(56) References Cited

U.S. PATENT DOCUMENTS 5,251,263 A 10/1993 Andrea et al.
5,278,913 A 1/1994 Delfosse et al.
(Continued)

FOREIGN PATENT DOCUMENTS

DE 102011013343 A1 9/2012
EP 1880699 A2 1/2008
(Continued)

OTHER PUBLICATIONS

U.S Appl. No. 14/029,159, Sep. 17, 2013, Li et al.
(Continued)

*Primary Examiner* — Vivian Chin
*Assistant Examiner* — Ubachukwu Odunukwe
(74) *Attorney, Agent, or Firm* — Mitch Harris, Atty at Law, LLC; Andrew M. Harris

(57) ABSTRACT

A personal audio device, such as a wireless telephone, includes an adaptive noise canceling (ANC) circuit that adaptively generates an anti-noise signal from a reference microphone signal and injects the anti-noise signal into the speaker or other transducer output to cause cancellation of ambient audio sounds. An error microphone is also provided proximate to the speaker to provide an error signal indicative of the effectiveness of the noise cancellation. A secondary path estimating adaptive filter is used to estimate the electro-acoustical path from the noise canceling circuit through the transducer so that source audio can be removed from the error signal. Adaptation of adaptive filters is sequenced so that update of their coefficients does not cause instability or error in the update. A level of the source audio with respect to the ambient audio can be determined to determine whether the system may generate erroneous anti-noise and/or become unstable.

24 Claims, 7 Drawing Sheets

(51) Int. Cl.
*G10K 11/178* (2006.01)
*H04B 3/23* (2006.01)
*G10L 21/0216* (2013.01)

(52) U.S. Cl.
CPC ..... *G10K 2210/00* (2013.01); *G10K 2210/108* (2013.01); *G10K 2210/3014* (2013.01); *G10K 2210/3017* (2013.01); *G10K 2210/30391* (2013.01); *G10L 2021/02165* (2013.01); *H04B 3/237* (2013.01)

(56) References Cited

U.S. PATENT DOCUMENTS

| | | | |
|---|---|---|---|
| 5,321,759 A | 6/1994 | Yuan | |
| 5,337,365 A | 8/1994 | Hamabe et al. | |
| 5,359,662 A | 10/1994 | Yuan et al. | |
| 5,410,605 A | 4/1995 | Sawada et al. | |
| 5,425,105 A | 6/1995 | Lo et al. | |
| 5,445,517 A | 8/1995 | Kondou et al. | |
| 5,465,413 A | 11/1995 | Enge et al. | |
| 5,548,681 A | 8/1996 | Gleaves et al. | |
| 5,586,190 A | 12/1996 | Trantow et al. | |
| 5,640,450 A | 6/1997 | Watanabe | |
| 5,699,437 A | 12/1997 | Finn | |
| 5,706,344 A | 1/1998 | Finn | |
| 5,740,256 A | 4/1998 | Castello Da Costa et al. | |
| 5,768,124 A | 6/1998 | Stothers et al. | |
| 5,815,582 A | 9/1998 | Claybaugh et al. | |
| 5,832,095 A | 11/1998 | Daniels | |
| 5,946,391 A | 8/1999 | Dragwidge et al. | |
| 5,991,418 A | 11/1999 | Kuo | |
| 6,041,126 A | 3/2000 | Terai et al. | |
| 6,118,878 A | 9/2000 | Jones | |
| 6,219,427 B1 | 4/2001 | Kates et al. | |
| 6,278,786 B1 | 8/2001 | McIntosh | |
| 6,282,176 B1 | 8/2001 | Hemkumar | |
| 6,418,228 B1 | 7/2002 | Terai et al. | |
| 6,434,246 B1 | 8/2002 | Kates et al. | |
| 6,434,247 B1 | 8/2002 | Kates et al. | |
| 6,522,746 B1 | 2/2003 | Marchok et al. | |
| 6,683,960 B1 | 1/2004 | Fujii et al. | |
| 6,766,292 B1 | 7/2004 | Chandran | |
| 6,768,795 B2 | 7/2004 | Feltstrom et al. | |
| 6,850,617 B1 | 2/2005 | Weigand | |
| 6,940,982 B1 | 9/2005 | Watkins | |
| 7,058,463 B1 | 6/2006 | Ruha et al. | |
| 7,103,188 B1 | 9/2006 | Jones | |
| 7,181,030 B2 | 2/2007 | Rasmussen et al. | |
| 7,330,739 B2 | 2/2008 | Somayajula | |
| 7,365,669 B1 | 4/2008 | Melanson | |
| 7,680,456 B2 | 3/2010 | Muhammad et al. | |
| 7,742,790 B2 | 6/2010 | Konchitsky et al. | |
| 7,817,808 B2 | 10/2010 | Konchitsky et al. | |
| 8,019,050 B2 | 9/2011 | Mactavish et al. | |
| 8,249,262 B2 | 8/2012 | Chua et al. | |
| 8,290,537 B2 | 10/2012 | Lee et al. | |
| 8,325,934 B2 | 12/2012 | Kuo | |
| 8,379,884 B2 | 2/2013 | Horibe et al. | |
| 8,401,200 B2 | 3/2013 | Tiscareno et al. | |
| 8,442,251 B2 | 5/2013 | Jensen et al. | |
| 8,804,974 B1 | 8/2014 | Melanson | |
| 8,908,877 B2 | 12/2014 | Abdollahzadeh Milani et al. | |
| 2001/0053228 A1 | 12/2001 | Jones | |
| 2002/0003887 A1 | 1/2002 | Zhang et al. | |
| 2003/0063759 A1 | 4/2003 | Brennan et al. | |
| 2003/0072439 A1* | 4/2003 | Gupta | 379/406.05 |
| 2003/0185403 A1 | 10/2003 | Sibbald | |
| 2004/0047464 A1 | 3/2004 | Yu et al. | |
| 2004/0165736 A1 | 8/2004 | Hetherington et al. | |
| 2004/0167777 A1 | 8/2004 | Hetherington et al. | |
| 2004/0202333 A1 | 10/2004 | Csermak et al. | |
| 2004/0240677 A1 | 12/2004 | Onishi et al. | |
| 2004/0242160 A1 | 12/2004 | Ichikawa et al. | |
| 2004/0264706 A1 | 12/2004 | Ray et al. | |
| 2005/0004796 A1 | 1/2005 | Trump et al. | |
| 2005/0018862 A1 | 1/2005 | Fisher | |
| 2005/0117754 A1 | 6/2005 | Sakawaki | |
| 2005/0207585 A1 | 9/2005 | Christoph | |
| 2005/0240401 A1 | 10/2005 | Ebenezer | |
| 2006/0035593 A1 | 2/2006 | Leeds | |
| 2006/0069556 A1 | 3/2006 | Nadjar et al. | |
| 2006/0153400 A1 | 7/2006 | Fujita et al. | |
| 2007/0030989 A1 | 2/2007 | Kates | |
| 2007/0033029 A1 | 2/2007 | Sakawaki | |
| 2007/0038441 A1 | 2/2007 | Inoue et al. | |
| 2007/0047742 A1 | 3/2007 | Taenzer et al. | |
| 2007/0053524 A1 | 3/2007 | Haulick et al. | |
| 2007/0076896 A1 | 4/2007 | Hosaka et al. | |
| 2007/0154031 A1 | 7/2007 | Avendano et al. | |
| 2007/0258597 A1 | 11/2007 | Rasmussen et al. | |
| 2007/0297620 A1 | 12/2007 | Choy | |
| 2008/0019548 A1 | 1/2008 | Avendano | |
| 2008/0101589 A1 | 5/2008 | Horowitz et al. | |
| 2008/0107281 A1 | 5/2008 | Togami et al. | |
| 2008/0144853 A1 | 6/2008 | Sommerfeldt et al. | |
| 2008/0177532 A1 | 7/2008 | Greiss et al. | |
| 2008/0181422 A1 | 7/2008 | Christoph | |
| 2008/0226098 A1 | 9/2008 | Haulick et al. | |
| 2008/0240413 A1* | 10/2008 | Mohammad et al. | 379/406.08 |
| 2008/0240455 A1 | 10/2008 | Inoue et al. | |
| 2008/0240457 A1 | 10/2008 | Inoue et al. | |
| 2009/0012783 A1 | 1/2009 | Klein | |
| 2009/0034748 A1 | 2/2009 | Sibbald | |
| 2009/0041260 A1 | 2/2009 | Jorgensen et al. | |
| 2009/0046867 A1 | 2/2009 | Clemow | |
| 2009/0060222 A1 | 3/2009 | Jeong et al. | |
| 2009/0080670 A1 | 3/2009 | Solbeck et al. | |
| 2009/0086990 A1 | 4/2009 | Christoph | |
| 2009/0175466 A1 | 7/2009 | Elko et al. | |
| 2009/0196429 A1 | 8/2009 | Ramakrishnan et al. | |
| 2009/0220107 A1 | 9/2009 | Every et al. | |
| 2009/0238369 A1 | 9/2009 | Ramakrishnan et al. | |
| 2009/0245529 A1 | 10/2009 | Asada et al. | |
| 2009/0254340 A1 | 10/2009 | Sun et al. | |
| 2009/0290718 A1 | 11/2009 | Kahn et al. | |
| 2009/0296965 A1 | 12/2009 | Kojima | |
| 2009/0304200 A1 | 12/2009 | Kim et al. | |
| 2009/0311979 A1 | 12/2009 | Husted et al. | |
| 2010/0014683 A1 | 1/2010 | Maeda et al. | |
| 2010/0014685 A1 | 1/2010 | Wurm | |
| 2010/0061564 A1 | 3/2010 | Clemow et al. | |
| 2010/0069114 A1 | 3/2010 | Lee et al. | |
| 2010/0082339 A1 | 4/2010 | Konchitsky et al. | |
| 2010/0098263 A1 | 4/2010 | Pan et al. | |
| 2010/0098265 A1 | 4/2010 | Pan et al. | |
| 2010/0124335 A1 | 5/2010 | Wessling et al. | |
| 2010/0124336 A1 | 5/2010 | Shridhar et al. | |
| 2010/0124337 A1 | 5/2010 | Wertz et al. | |
| 2010/0131269 A1 | 5/2010 | Park et al. | |
| 2010/0150367 A1 | 6/2010 | Mizuno | |
| 2010/0158330 A1 | 6/2010 | Guissin et al. | |
| 2010/0166203 A1 | 7/2010 | Peissig et al. | |
| 2010/0195838 A1 | 8/2010 | Bright | |
| 2010/0195844 A1 | 8/2010 | Christoph et al. | |
| 2010/0207317 A1 | 8/2010 | Iwami et al. | |
| 2010/0246855 A1 | 9/2010 | Chen | |
| 2010/0266137 A1 | 10/2010 | Sibbald et al. | |
| 2010/0272276 A1 | 10/2010 | Carreras et al. | |
| 2010/0272283 A1 | 10/2010 | Carreras et al. | |
| 2010/0274564 A1 | 10/2010 | Bakalos et al. | |
| 2010/0284546 A1 | 11/2010 | DeBrunner et al. | |
| 2010/0291891 A1 | 11/2010 | Ridgers et al. | |
| 2010/0296666 A1 | 11/2010 | Lin | |
| 2010/0296668 A1 | 11/2010 | Lee et al. | |
| 2010/0310086 A1 | 12/2010 | Magrath et al. | |
| 2010/0322430 A1 | 12/2010 | Isberg | |
| 2011/0007907 A1* | 1/2011 | Park et al. | 381/71.8 |
| 2011/0106533 A1 | 5/2011 | Yu | |
| 2011/0129098 A1 | 6/2011 | Delano et al. | |
| 2011/0130176 A1 | 6/2011 | Magrath et al. | |
| 2011/0142247 A1 | 6/2011 | Fellers et al. | |
| 2011/0144984 A1 | 6/2011 | Konchitsky | |
| 2011/0158419 A1* | 6/2011 | Theverapperuma et al. | 381/71.8 |
| 2011/0206214 A1 | 8/2011 | Christoph et al. | |

(56) References Cited

U.S. PATENT DOCUMENTS

| | | | |
|---|---|---|---|
| 2011/0222698 | A1 | 9/2011 | Asao et al. |
| 2011/0249826 | A1 | 10/2011 | Van Leest |
| 2011/0288860 | A1 | 11/2011 | Schevciw et al. |
| 2011/0293103 | A1 | 12/2011 | Park et al. |
| 2011/0299695 | A1* | 12/2011 | Nicholson .................... 381/71.6 |
| 2011/0305347 | A1 | 12/2011 | Wurm |
| 2011/0317848 | A1 | 12/2011 | Ivanov et al. |
| 2012/0135787 | A1 | 5/2012 | Kusunoki et al. |
| 2012/0140917 | A1 | 6/2012 | Nicholson et al. |
| 2012/0140942 | A1 | 6/2012 | Loeda |
| 2012/0140943 | A1* | 6/2012 | Hendrix et al. ............ 381/71.11 |
| 2012/0148062 | A1 | 6/2012 | Scarlett et al. |
| 2012/0155666 | A1 | 6/2012 | Nair |
| 2012/0170766 | A1 | 7/2012 | Alves et al. |
| 2012/0207317 | A1 | 8/2012 | Abdollahzadeh Milani et al. |
| 2012/0215519 | A1 | 8/2012 | Park et al. |
| 2012/0250873 | A1 | 10/2012 | Bakalos et al. |
| 2012/0259626 | A1 | 10/2012 | Li et al. |
| 2012/0263317 | A1 | 10/2012 | Shin et al. |
| 2012/0300958 | A1 | 11/2012 | Klemmensen |
| 2012/0300960 | A1 | 11/2012 | Mackay et al. |
| 2012/0308021 | A1 | 12/2012 | Kwatra et al. |
| 2012/0308024 | A1 | 12/2012 | Alderson et al. |
| 2012/0308025 | A1 | 12/2012 | Hendrix et al. |
| 2012/0308026 | A1 | 12/2012 | Kamath et al. |
| 2012/0308027 | A1 | 12/2012 | Kwatra |
| 2012/0308028 | A1 | 12/2012 | Kwatra et al. |
| 2012/0310640 | A1 | 12/2012 | Kwatra et al. |
| 2013/0010982 | A1 | 1/2013 | Elko et al. |
| 2013/0083939 | A1 | 4/2013 | Fellers et al. |
| 2013/0243198 | A1 | 9/2013 | Van Rumpt |
| 2013/0243225 | A1 | 9/2013 | Yokota |
| 2013/0272539 | A1 | 10/2013 | Kim et al. |
| 2013/0287218 | A1 | 10/2013 | Alderson et al. |
| 2013/0287219 | A1 | 10/2013 | Hendrix et al. |
| 2013/0301842 | A1 | 11/2013 | Hendrix et al. |
| 2013/0301846 | A1 | 11/2013 | Alderson et al. |
| 2013/0301848 | A1 | 11/2013 | Zhou et al. |
| 2013/0301849 | A1 | 11/2013 | Alderson et al. |
| 2013/0343556 | A1 | 12/2013 | Bright |
| 2013/0343571 | A1 | 12/2013 | Rayala et al. |
| 2014/0044275 | A1 | 2/2014 | Goldstein et al. |
| 2014/0050332 | A1 | 2/2014 | Nielsen et al. |
| 2014/0072134 | A1 | 3/2014 | Po et al. |
| 2014/0086425 | A1 | 3/2014 | Jensen et al. |
| 2014/0177851 | A1 | 6/2014 | Kitazawa et al. |
| 2014/0211953 | A1 | 7/2014 | Alderson et al. |
| 2014/0270222 | A1 | 9/2014 | Hendrix et al. |
| 2014/0270223 | A1 | 9/2014 | Li et al. |
| 2014/0270224 | A1 | 9/2014 | Zhou et al. |
| 2015/0092953 | A1 | 4/2015 | Abdollahzadeh Milani et al. |

FOREIGN PATENT DOCUMENTS

| | | |
|---|---|---|
| EP | 1947642 A1 | 7/2008 |
| EP | 2133866 A1 | 12/2009 |
| EP | 2216774 A1 | 8/2010 |
| EP | 2395500 A1 | 12/2011 |
| EP | 2395501 A1 | 12/2011 |
| GB | 2401744 A | 11/2004 |
| GB | 2455821 A | 6/2009 |
| GB | 2455824 A | 6/2009 |
| GB | 2455828 A | 6/2009 |
| GB | 2484722 A | 4/2012 |
| JP | H06-186985 A | 7/1994 |
| WO | WO 9911045 | 3/1999 |
| WO | WO 03/015074 A1 | 2/2003 |
| WO | WO 03015275 A1 | 2/2003 |
| WO | WO 2004009007 A1 | 1/2004 |
| WO | WO 2004017303 A1 | 2/2004 |
| WO | WO 2007007916 A1 | 1/2007 |
| WO | WO 2007113487 A1 | 11/2007 |
| WO | WO 2010117714 A1 | 10/2010 |
| WO | WO 2012134874 A1 | 10/2012 |

OTHER PUBLICATIONS

U.S. Appl. No. 14/062,951, Oct. 25, 2013, Zhou et al.

U.S. Appl. No. 14/578,567, Dec. 22, 2014, Kwatra et al.

Widrow, B., et al., Adaptive Noise Cancelling; Principles and Applications, Proceedings of the IEEE, Dec. 1975, pp. 1692-1716, vol. 63, No. 13, IEEE, New York, NY, US.

Morgan, et al., A Delayless Subband Adaptive Filter Architecture, IEEE Transactions on Signal Processing, IEEE Service Center, Aug. 1995, pp. 1819-1829, vol. 43, No. 8, New York, NY, US.

International Preliminary Report on Patentability in PCT/US2013/036532 mailed on Nov. 20, 2014, 10 pages (pp. 1-10 in pdf).

U.S. Appl. No. 14/228,322, Mar. 28, 2014, Alderson et al.

U.S. Appl. No. 13/762,504, Feb. 8, 2013, Abdollahzadeh Milani et al.

U.S. Appl. No. 13/721,832, Dec. 20, 2012, Lu et al.

U.S. Appl. No. 13/724,656, Dec. 21, 2012, Lu et al.

U.S. Appl. No. 14/252,235, Apr. 14, 2014, Lu et al.

U.S. Appl. No. 13/968,013, Aug. 15, 2013, Abdollahzadeh Milani et al.

U.S. Appl. No. 13/924,935, Jun. 24, 2013, Hellman.

U.S. Appl. No. 13/896,526, May 17, 2013, Naderi.

U.S. Appl. No. 14/101,955, Dec. 10, 2013, Alderson.

U.S. Appl. No. 14/101,777, Dec. 10, 2013, Alderson et al.

Abdollahzadeh Milani, et al., "On Maximum Achievable Noise Reduction in ANC Systems",2010 IEEE International Conference on Acoustics Speech and Signal Processing, Mar. 14-19, 2010, pp. 349-352, Dallas, TX, US.

Cohen, Israel, "Noise Spectrum Estimation in Adverse Environments: Improved Minima Controlled Recursive Averaging", IEEE Transactions on Speech and Audio Processing, Sep. 2003, pp. 1-11, vol. 11, Issue 5, Piscataway, NJ, US.

Ryan, et al., "Optimum Near-Field Performance of Microphone Arrays Subject to a Far-Field Beampattern Constraint", J. Acoust. Soc. Am., Nov. 2000, pp. 2248-2255, 108 (5), Pt. 1, Ottawa, Ontario, Canada.

Cohen, et al., "Noise Estimation by Minima Controlled Recursive Averaging for Robust Speech Enhancement", IEEE Signal Processing Letters, Jan. 2002, pp. 12-15, vol. 9, No. 1, Piscataway, NJ, US.

Martin, Rainer, "Noise Power Spectral Density Estimation Based on Optimal Smoothing and Minimum Statistics", IEEE Transactions on Speech and Audio Processing, Jul. 2001, pp. 504-512, vol. 9, No. 5, Piscataway, NJ, US.

Martin, Rainer, "Spectral Subtraction Based on Minimum Statistics", Signal Processing VII Theories and Applications, Proceedings of EUSIPCO-94, 7th European Signal Processing Conference, Sep. 13-16, 1994, pp. 1182-1185, vol. III, Edinburgh, Scotland, U.K.

Booij, et al., "Virtual sensors for local, three dimensional, broadband multiple-channel active noise control and the effects on the quiet zones", Proceedings of the International Conference on Noise and Vibration Engineering, ISMA 2010, Sep. 20-22, 2010, pp. 151-166, Leuven.

Kuo, et al., "Residual noise shaping technique for active noise control systems", J. Acoust. Soc. Am. 95 (3), Mar. 1994, pp. 1665-1668.

Lopez-Caudana, Edgar Omar, "Active Noise Cancellation: The Unwanted Signal and the Hybrid Solution", Adaptive Filtering Applications, Dr. Lino Garcia (Ed.), Jul. 2011, pp. 49-84, ISBN: 978-953-307-306-4, InTech.

Senderowicz, et al., "Low-Voltage Double-Sampled Delta-Sigma Converters", IEEE Journal on Solid-State Circuits, Dec. 1997, pp. 1907-1919, vol. 32, No. 12, Piscataway, NJ.

Hurst, et al., "An improved double sampling scheme for switched-capacitor delta-sigma modulators", 1992 IEEE Int. Symp. on Circuits and Systems, May 10-13, 1992, vol. 3, pp. 1179-1182, San Diego, CA.

U.S. Appl. No. 13/686,353, Nov. 27, 2012, Hendrix et al.

U.S. Appl. No. 13/795,160, Mar. 12, 2013, Hendrix et al.

U.S. Appl. No. 13/692,367, Dec. 3, 2012, Alderson et al.

U.S. Appl. No. 13/722,119, Dec. 20, 2012, Hendrix et al.

U.S. Appl. No. 13/784,018, Mar. 4, 2013, Alderson et al.

U.S. Appl. No. 13/787, 906, Mar. 7, 2013, Alderson et al.

U.S. Appl. No. 13/729,141, Dec. 28, 2012, Zhou et al.

U.S. Appl. No. 13/794,931, Mar. 12, 2013, Lu et al.

U.S. Appl. No. 13/794,979, Mar. 12, 2013, Alderson et al.

(56) References Cited

OTHER PUBLICATIONS

Pfann, et al., "LMS Adaptive Filtering with Delta-Sigma Modulated Input Signals," IEEE Signal Processing Letters, Apr. 1998, pp. 95-97, vol. 5, No. 4, IEEE Press, Piscataway, NJ.

Toochinda, et al. "A Single-Input Two-Output Feedback Formulation for ANC Problems," Proceedings of the 2001 American Control Conference, Jun. 2001, pp. 923-928, vol. 2, Arlington, VA.

Kuo, et al., "Active Noise Control: A Tutorial Review," Proceedings of the IEEE, Jun. 1999, pp. 943-973, vol. 87, No. 6, IEEE Press, Piscataway, NJ.

Johns, et al., "Continuous-Time LMS Adaptive Recursive Filters," IEEE Transactions on Circuits and Systems, Jul. 1991, pp. 769-778, vol. 38, No. 7, IEEE Press, Piscataway, NJ.

Shoval, et al., "Comparison of DC Offset Effects in Four LMS Adaptive Algorithms," IEEE Transactions on Circuits and Systems II: Analog and Digital Processing, Mar. 1995, pp. 176-185, vol. 42, Issue 3, IEEE Press, Piscataway, NJ.

Mali, Dilip, "Comparison of DC Offset Effects on LMS Algorithm and its Derivatives," International Journal of Recent Trends in Engineering, May 2009, pp. 323-328, vol. 1, No. 1, Academy Publisher.

Kates, James M., "Principles of Digital Dynamic Range Compression," Trends in Amplification, Spring 2005, pp. 45-76, vol. 9, No. 2, Sage Publications.

Gao, et al., "Adaptive Linearization of a Loudspeaker," IEEE International Conference on Acoustics, Speech, and Signal Processing, Apr. 14-17, 1991, pp. 3589-3592, Toronto, Ontario, CA.

Silva, et al., "Convex Combination of Adaptive Filters With Different Tracking Capabilities," IEEE International Conference on Acoustics, Speech, and Signal Processing, Apr. 15-20, 2007, pp. III 925-928, vol. 3, Honolulu, HI, USA.

Akhtar, et al., "A Method for Online Secondary Path Modeling in Active Noise Control Systems," IEEE International Symposium on Circuits and Systems, May 23-26, 2005, pp. 264-267, vol. 1, Kobe, Japan.

Davari, et al., "A New Online Secondary Path Modeling Method for Feedforward Active Noise Control Systems," IEEE International Conference on Industrial Technology, Apr. 21-24, 2008, pp. 1-6, Chengdu, China.

Lan, et al., "An Active Noise Control System Using Online Secondary Path Modeling With Reduced Auxiliary Noise," IEEE Signal Processing Letters, Jan. 2002, pp. 16-18, vol. 9, Issue 1, IEEE Press, Piscataway, NJ.

Liu, et al., "Analysis of Online Secondary Path Modeling With Auxiliary Noise Scaled by Residual Noise Signal," IEEE Transactions on Audio, Speech and Language Processing, Nov. 2010, pp. 1978-1993, vol. 18, Issue 8, IEEE Press, Piscataway, NJ.

U.S. Appl. No. 14/656,124, Mar. 12, 2015, Hendrix et al.

U.S. Appl. No. 13/968,007, Aug. 15, 2013, Hendrix et al.

Parkins, et al., "Narrowband and broadband active control in an enclosure using the acoustic energy density", J. Acoust. Soc. Am. Jul. 2000, pp. 192-203, vol. 108, issue 1, US.

Feng, et al., "A broadband self-tuning active noise equaliser", Signal Processing, Oct. 1, 1997, pp. 251-256, vol. 62, No. 2, Elsevier Science Publishers B.V. Amsterdam, NL.

Zhang, et al., "A Robust Online Secondary Path Modeling Method with Auxiliary Noise Power Scheduling Strategy and Norm Constraint Manipulation", IEEE Transactions on Speech and Audio Processing, IEEE Service Center, Jan. 1, 2003, pp. 45-53, vol. 11, No. 1, NY.

Lopez-Gaudana, et al., "A hybrid active noise cancelling with secondary path modeling", 51st Midwest Symposium on Circuits and Systems, MWSCAS 2008, Aug. 10-13, 2008, pp. 277-280, IEEE, Knoxville, TN.

International Search Report and Written Opinion in PCT/US2013/036532, mailed on Sep. 10, 2013, 14 pages (pp. 1-14 in pdf).

U.S. Appl. No. 14/197,814, Mar. 5, 2014, Kaller et al.

U.S. Appl. No. 14/210,537, Mar. 14, 2014, Abdollahzadeh Milani et al.

U.S. Appl. No. 14/210,589, Mar. 14, 2014, Abdollahzadeh Milani et al.

Black, John W., "An Application of Side-Tone in Subjective Tests of Microphones and Headsets", Project Report No. NM 001 064.01.20, Research Report of the U.S. Naval School of Aviation Medicine, Feb. 1, 1954, 12 pages (pp. 1-12 in pdf), Pensacola, FL, US.

Peters, Robert W., "The Effect of High-Pass and Low-Pass Filtering of Side-Tone Upon Speaker Intelligibility", Project Report No. NM 001 064.01.25, Research Report of the U.S. Naval School of Aviation Medicine, Aug. 16, 1954, 13 pages (pp. 1-13 in pdf), Pensacola, FL, US.

Lane, et al., "Voice Level: Autophonic Scale, Perceived Loudness, and the Effects of Sidetone", The Journal of the Acoustical Society of America, Feb. 1961, pp. 160-167, vol. 33, No. 2., Cambridge, MA, US.

Liu, et al., "Compensatory Responses to Loudness-shifted Voice Feedback During Production of Mandarin Speech", Journal of the Acoustical Society of America, Oct. 2007, pp. 2405-2412, vol. 122, No. 4.

Paepcke, et al., "Yelling in the Hall: Using Sidetone to Address a Problem with Mobile Remote Presence Systems", Symposium on User Interface Software and Technology, Oct. 16-19, 2011, 10 pages (pp. 1-10 in pdf), Santa Barbara, CA, US.

Therrien, et al., "Sensory Attenuation of Self-Produced Feedback: The Lombard Effect Revisited", PLOS ONE, Nov. 2012, pp. 1-7, vol. 7, Issue 11, e49370, Ontario, Canada.

Campbell, Mikey, "Apple looking into self-adjusting earbud headphones with noise cancellation tech", Apple Insider, Jul. 4, 2013, pp. 1-10 (10 pages in pdf), downloaded on May 14, 2014 from http://appleinsider.com/articles/13/07/04/apple-looking-into-self-adjusting-earbud-headphones-with-noise-cancellation-tech.

Jin, et al. "A simultaneous equation method-based online secondary path modeling algorithm for active noise control", Journal of Sound and Vibration, Apr. 25, 2007, pp. 455-474, vol. 303, No. 3-5, London, GB.

Erkelens, et al., "Tracking of Nonstationary Noise Based on Data-Driven Recursive Noise Power Estimation", IEEE Transactions on Audio Speech and Language Processing, Aug. 2008, pp. 1112-1123, vol. 16, No. 6, Piscataway, NJ, US.

Rao, et al., "A Novel Two State Single Channel Speech Enhancement Technique", India Conference (INDICON) 2011 Annual IEEE, Dec. 2011, 6 pages (pp. 1-6 in pdf), Piscataway, NJ, US.

Rangachari, et al., "A noise-estimation algorithm for highly non-stationary environments", Speech Communication, Feb. 2006, pp. 220-231, vol. 48, No. 2. Elsevier Science Publishers.

* cited by examiner

SEQUENCED ADAPTATION OF ANTI-NOISE GENERATOR RESPONSE AND SECONDARY PATH RESPONSE IN AN ADAPTIVE NOISE CANCELING SYSTEM

This U.S. Patent Application claims priority under 35 U.S.C. 517(e) to U.S. Provisional patent application Ser. No. 61/645,333 filed on May 10, 2012.

BACKGROUND OF THE INVENTION

1. Field of the Invention

The present invention relates generally to personal audio devices such as wireless telephones that include adaptive noise cancellation (ANC), and more specifically, to sequenced adaptation of ANC adaptive responses in a personal audio device that uses a secondary path estimate in addition to adaptive anti-noise filtering.

2. Background of the Invention

Wireless telephones, such as mobile/cellular telephones, cordless telephones, and other consumer audio devices, such as MP3 players, are in widespread use. Performance of such devices with respect to intelligibility can be improved by providing noise canceling using a microphone to measure ambient acoustic events and then using signal processing to insert an anti-noise signal into the output of the device to cancel the ambient acoustic events.

Noise canceling operation can be improved by measuring the transducer output of a device at the transducer to determine the effectiveness of the noise canceling using an error microphone. The measured output of the transducer is ideally the source audio, e.g., downlink audio in a telephone and/or playback audio in either a dedicated audio player or a telephone, since the noise canceling signal(s) are ideally canceled by the ambient noise at the location of the transducer. To remove the source audio from the error microphone signal, the secondary path from the transducer through the error microphone can be estimated and used to filter the source audio to the correct phase and amplitude for subtraction from the error microphone signal. However, when the source audio has a very high amplitude, acoustic leakage from the transducer to the reference microphone can cause the adaptive filter that generates the noise-canceling (anti-noise) signal to adapt improperly.

Therefore, it would be desirable to provide a personal audio device, including wireless telephones, that provides noise cancellation using a secondary path estimate to measure the output of the transducer and an adaptive filter that generates the anti-noise signal, in which recovery from an incorrect ANC response, such as an incorrect response occurring due to adaptation to leakage of the source audio signal into the reference microphone, can be accomplished.

SUMMARY OF THE INVENTION

The above-stated objective of providing a personal audio device providing noise canceling including a secondary path estimate that provides for recovery from an undesirable state of the anti-noise generating adaptive response, is accomplished in a personal audio device, a method of operation, and an integrated circuit.

The personal audio device includes a housing, with a transducer mounted on the housing for reproducing an audio signal that includes both source audio for providing to a listener and an anti-noise signal for countering the effects of ambient audio sounds in an acoustic output of the transducer. A reference microphone is mounted on the housing to provide a reference microphone signal indicative of the ambient audio sounds. The personal audio device further includes an adaptive noise canceling (ANC) processing circuit within the housing for adaptively generating an anti-noise signal from the reference microphone signal such that the anti-noise signal causes substantial cancellation of the ambient audio sounds. An error microphone is included for controlling the adaptation of the anti-noise signal to cancel the ambient audio sounds and for compensating for the electro-acoustical path from the output of the processing circuit through the transducer. The ANC processing circuit sequences adaptation of a secondary path adaptive filter that estimates the response of the secondary path and another adaptive filter that generates the anti-noise signal so that the overall ANC operation remains stable when the secondary path response changes and the secondary path estimate is updated.

In another feature, the ANC processing circuit detects that the source audio leakage from the output transducer to the reference microphone is, or will be, too great for proper operation and takes action on adaptation of the adaptive filter that generates the anti-noise signal to prevent or remedy improper operation.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

Noise canceling techniques and circuits that can be implemented in a personal audio device, such as a wireless telephone, are disclosed. The personal audio device includes an adaptive noise canceling (ANC) circuit that measures the ambient acoustic environment and generates a signal that is injected into the speaker (or other transducer) output to cancel ambient acoustic events. A reference microphone is provided to measure the ambient acoustic environment, and an error microphone is included to measure the ambient audio and transducer output at the transducer, thus giving an indication of the effectiveness of the noise cancelation. A secondary path estimating adaptive filter is used to remove the playback audio from the error microphone signal in order to generate an error signal. However, depending on the level of the source audio reproduced by the personal audio device, e.g., downlink audio during a telephone conversation, leakage from the transducer to the reference microphone may cause unstable operation and/or improper adaptation of the ANC circuits.

Further, on recovery from an improperly adapted state, or during initialization of the ANC circuits, unless the secondary path estimating adaptive filter has the proper response, the remainder of the ANC system may not adapt properly, or may become unstable. The exemplary personal audio devices, method and circuits shown below sequence adaptation of the secondary path estimating adaptive filter and the remainder of the ANC system to avoid instabilities and to adapt the ANC system to the proper response. Further, the magnitude of the leakage of the source audio into the reference microphone can be measured or estimated, and action taken on the adaptation of the ANC system and recovery from such a condition after the source audio has ended or decreased in volume such that stable operation can be expected.

Figure 1:
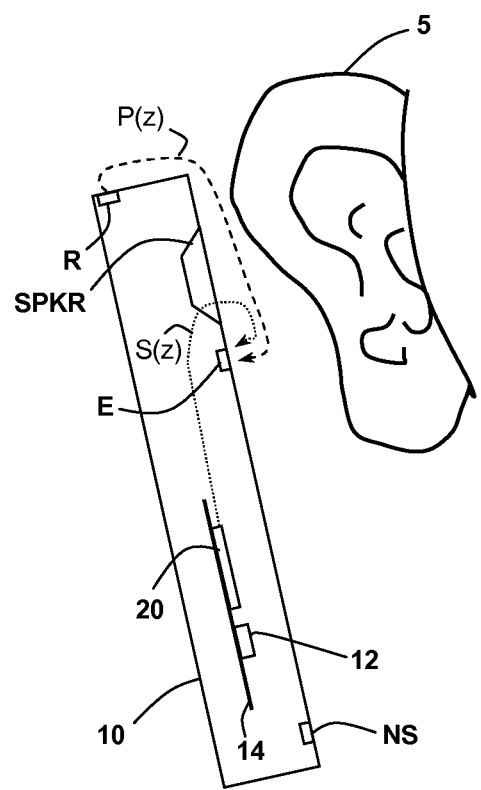
FIG. 1 is an illustration of an exemplary wireless telephone 10.

FIG. 1 shows an exemplary wireless telephone 10 in proximity to a human ear 5. Illustrated wireless telephone 10 is an example of a device in which techniques illustrated herein may be employed, but it is understood that not all of the elements or configurations embodied in illustrated wireless telephone 10, or in the circuits depicted in subsequent illustrations, are required. Wireless telephone 10 includes a transducer such as speaker SPKR that reproduces distant speech received by wireless telephone 10, along with other local audio events such as ringtones, stored audio program material, near-end speech, sources from web-pages or other network communications received by wireless telephone 10 and audio indications such as battery low and other system event notifications. A near-speech microphone NS is provided to capture near-end speech, which is transmitted from wireless telephone 10 to the other conversation participant(s).

Wireless telephone 10 includes adaptive noise canceling (ANC) circuits and features that inject an anti-noise signal into speaker SPKR to improve intelligibility of the distant speech and other audio reproduced by speaker SPKR. A reference microphone R is provided for measuring the ambient acoustic environment and is positioned away from the typical position of a user's/talker's mouth, so that the near-end speech is minimized in the signal produced by reference microphone R. A third microphone, error microphone E, is provided in order to further improve the ANC operation by providing a measure of the ambient audio combined with the audio signal reproduced by speaker SPKR close to ear 5, when wireless telephone 10 is in close proximity to ear 5. Exemplary circuit 14 within wireless telephone 10 includes an audio CODEC integrated circuit 20 that receives the signals from reference microphone R, near speech microphone NS, and error microphone E and interfaces with other integrated circuits such as an RF integrated circuit 12 containing the wireless telephone transceiver. In other embodiments of the invention, the circuits and techniques disclosed herein may be incorporated in a single integrated circuit that contains control circuits and other functionality for implementing the entirety of the personal audio device, such as an MP3 player-on-a-chip integrated circuit.

In general, the ANC techniques disclosed herein measure ambient acoustic events (as opposed to the output of speaker SPKR and/or the near-end speech)impinging on reference microphone R, and by also measuring the same ambient acoustic events impinging on error microphone E, the ANC processing circuits of illustrated wireless telephone 10 adapt an anti-noise signal generated from the output of reference microphone R to have a characteristic that minimizes the amplitude of the ambient acoustic events present at error microphone E. Since acoustic path $P(z)$ extends from reference microphone R to error microphone E, the ANC circuits are essentially estimating acoustic path $P(z)$ combined with removing effects of an electro-acoustic path $S(z)$. Electro-acoustic path $S(z)$ represents the response of the audio output circuits of CODEC IC 20 and the acoustic/electric transfer function of speaker SPKR including the coupling between speaker SPKR and error microphone E in the particular acoustic environment. Electro-acoustic path $S(z)$ is affected by the proximity and structure of ear 5 and other physical objects and human head structures that may be in proximity to wireless telephone 10, when wireless telephone 10 is not firmly pressed to ear 5. While the illustrated wireless telephone 10 includes a two microphone ANC system with a third near speech microphone NS, other systems that do not include separate error and reference microphones can implement the above-described techniques. Alternatively, speech microphone NS can be used to perform the function of the reference microphone R in the above-described system. Finally, in personal audio devices designed only for audio playback, near speech microphone NS will generally not be included, and the near-speech signal paths in the circuits described in further detail below can be omitted.

Figure 2:
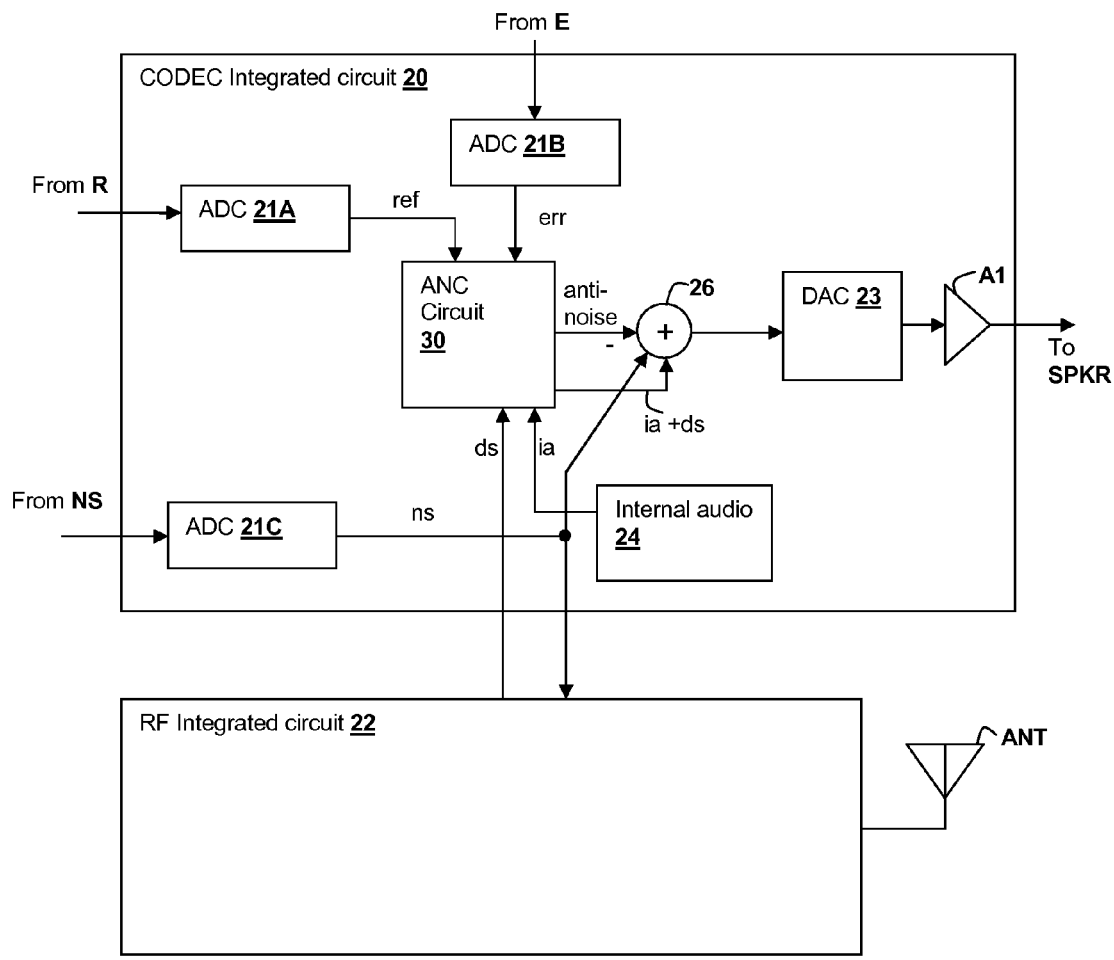
FIG. 2 is a block diagram of circuits within wireless telephone 10.

Referring now to FIG. 2, circuits within wireless telephone 10 are shown in a block diagram. CODEC integrated circuit 20 includes an analog-to-digital converter (ADC) 21A for receiving the reference microphone signal and generating a digital representation ref of the reference microphone signal, an ADC 21B for receiving the error microphone signal and generating a digital representation err of the error microphone signal, and an ADC 21C for receiving the near speech microphone signal and generating a digital representation of near speech microphone signal ns. CODEC IC 20 generates an output for driving speaker SPKR from an amplifier A1, which amplifies the output of a digital-to-analog converter (DAC) 23 that receives the output of a combiner 26. Combiner 26 combines audio signals ia from internal audio sources 24, the anti-noise signal anti-noise generated by ANC circuit 30, which by convention has the same polarity as the noise in reference microphone signal ref and is therefore subtracted by combiner 26, a portion of near speech signal ns so that the user of wireless telephone 10 hears their own voice in proper relation to downlink speech ds, which is received from radio frequency (RF) integrated circuit 22. In accordance with an embodiment of the present invention, downlink speech ds is provided to ANC circuit 30. The downlink speech ds, internal audio ia, and noise (or source audio/noise if applied as alternative signals) are provided to combiner 26, so that signal ds+ia is always present to estimate acoustic path $S(z)$ with a secondary path adaptive filter within ANC circuit 30. Near speech signal ns is also provided to RF integrated circuit 22 and is transmitted as uplink speech to the service provider via antenna ANT.

Figure 3:
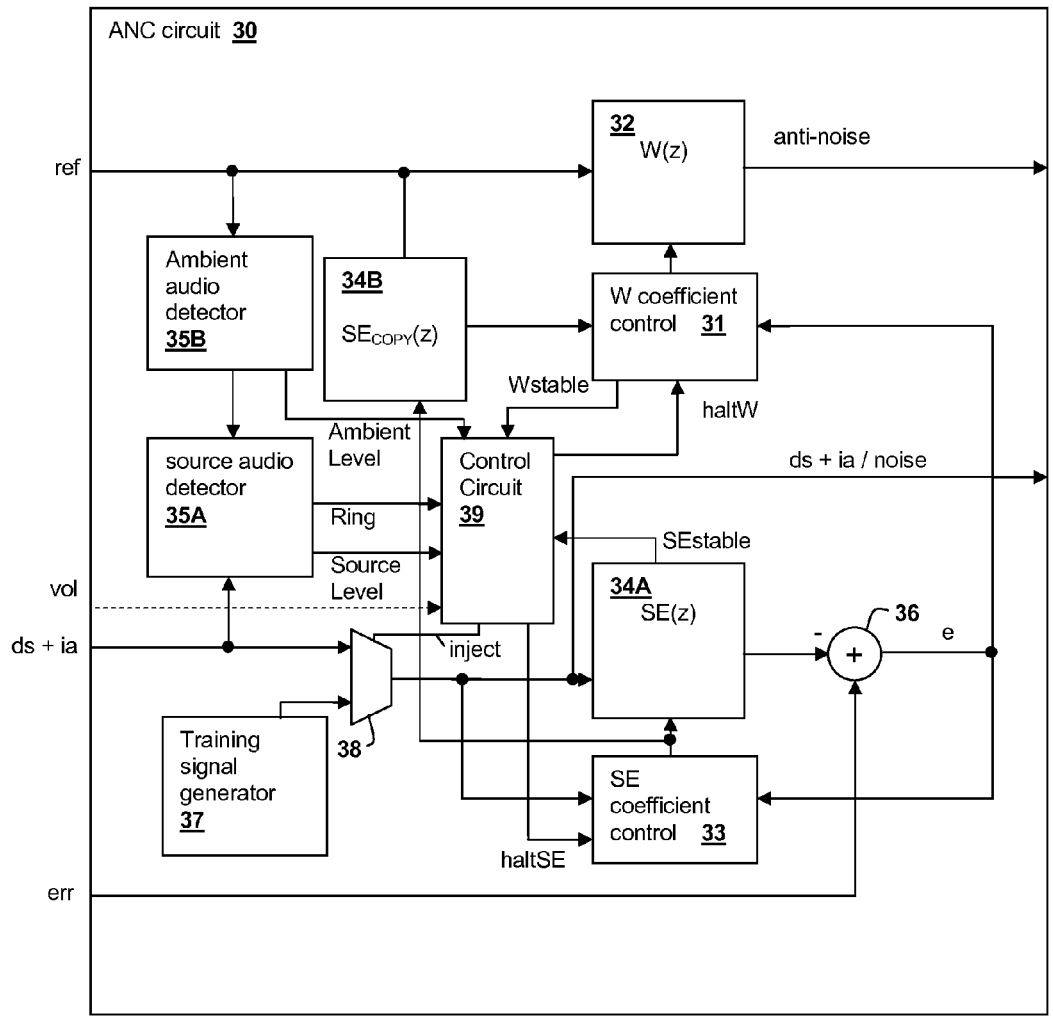
FIG. 3 is a block diagram depicting an example of signal processing circuits and functional blocks that may be included within ANC circuit 30 of CODEC integrated circuit 20 of FIG. 2.

FIG. 3 shows one example of details of ANC circuit 30 of FIG. 2. An adaptive filter 32 receives reference microphone signal ref and under ideal circumstances, adapts its transfer function $W(z)$ to be $P(z)/S(z)$ to generate the anti-noise signal anti-noise, which is provided to an output combiner that combines the anti-noise signal with the audio signal to be reproduced by the transducer, as exemplified by combiner 26 of FIG. 2. The coefficients of adaptive filter 32 are controlled by a W coefficient control block 31 that uses a correlation of two signals to determine the response of adaptive filter 32, which generally minimizes the error, in a least-mean squares sense, between those components of reference microphone signal ref present in error microphone signal err. The signals processed by W coefficient control block 31 are the reference microphone signal ref as shaped by a copy of an estimate of the response of path $S(z)$ provided by filter 34B and another signal that includes error microphone signal err. By transforming reference microphone signal ref with a copy of the estimate of the response of path S(z), response $SE_{COPY}(z)$, and minimizing error microphone signal err after removing components of error microphone signal err due to playback of source audio, adaptive filter 32 adapts to the desired response of P(z)/S(z). In addition to error microphone signal err, the other signal processed along with the output of filter 34B by W coefficient control block 31 includes an inverted amount of the source audio including downlink audio signal ds and internal audio ia that has been processed by filter response SE(z), of which response $SE_{COPY}(z)$ is a copy. By injecting an inverted amount of source audio, adaptive filter 32 is prevented from adapting to the relatively large amount of source audio present in error microphone signal err. By transforming the inverted copy of downlink audio signal ds and internal audio ia with the estimate of the response of path S(z), the source audio that is removed from error microphone signal err before processing should match the expected version of downlink audio signal ds and internal audio ia reproduced at error microphone signal err. The source audio that is removed from error microphone signal err matches the combined downlink audio signal ds and internal audio ia reproduced at error microphone signal err, since the electrical and acoustical path of S(z) is the path taken by downlink audio signal ds and internal audio ia to arrive at error microphone E. Filter 34B is not an adaptive filter, per se, but has an adjustable response that is tuned to match the response of adaptive filter 34A, so that the response of filter 34B tracks the adapting of adaptive filter 34A.

To implement the above, adaptive filter 34A has coefficients controlled by SE coefficient control block 33, which processes the source audio (ds+ia) and error microphone signal err after removal, by a combiner 36, of the above-described filtered downlink audio signal ds and internal audio ia, that has been filtered by adaptive filter 34A to represent the expected source audio delivered to error microphone E. Adaptive filter 34A is thereby adapted to generate an error signal e from downlink audio signal ds and internal audio ia, that when subtracted from error microphone signal err, contains the content of error microphone signal err that is not due to source audio (ds+ia). However, if downlink audio signal ds and internal audio ia are both absent, e.g., at the beginning of a telephone call, or have very low amplitude, SE coefficient control block 33 will not have sufficient input to estimate acoustic path S(z). Therefore, in ANC circuit 30, a source audio detector 35A detects whether sufficient source audio (ds+ia) is present, and updates the secondary path estimate if sufficient source audio (ds+ia) is present. Source audio detector 35A may be replaced by a speech presence signal if a speech presence signal is available from a digital source of the downlink audio signal ds, or a playback active signal provided from media playback control circuits. A selector 38 is provided to select between source audio (ds+ia) and the output of a training signal generator 37 at an input to secondary path adaptive filter 34A and SE coefficient control block 33, according to a control signal inject, provided from control circuit 39, which when asserted, selects the output of training signal generator 37. Assertion of control signal inject allows ANC circuit 30 to update the estimate of acoustic path S(z) even when no suitable source audio signal is present. A noise burst or other training signal is thereby injected into secondary path adaptive filter 34A, when a control circuit 39 temporarily selects the output of training signal generator 37. Alternatively, selector 38 can be replaced with a combiner that adds the training signal to source audio (ds+ia).

Figure 4:
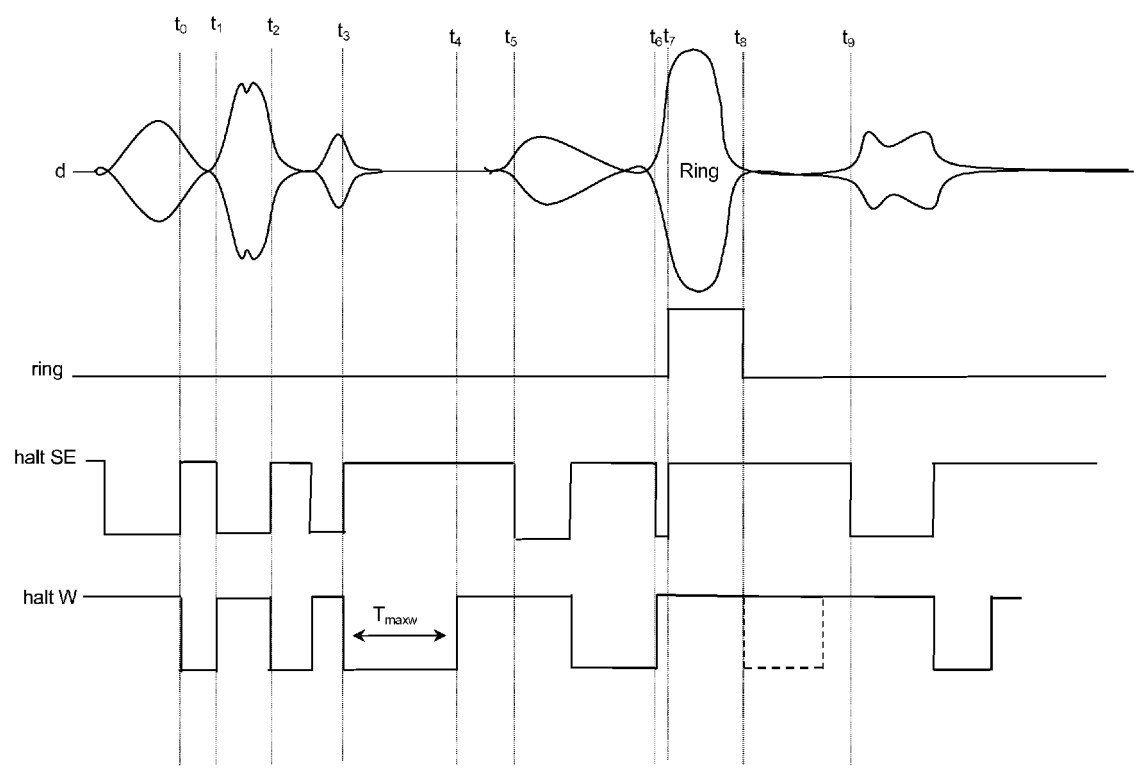
FIGS. 4-5 are signal waveform diagrams illustrating operation of ANC circuit 30 of CODEC integrated circuit 20 of FIG. 2 in accordance with various implementations.

Control circuit 39 receives inputs from a source audio detector 35A, which include a Ring indicator that indicates when a remote ring signal is present in downlink audio signal ds and a Source Level indication reflecting the detected level of the overall source audio (ds+ia). Control circuit also receives an input from an ambient audio detector 35B that provides an indication of the detected level of reference microphone signal ref. Control circuit 39 may receive an indication vol of the volume setting of the personal audio device. Control circuit 39 also receives a stability indication Wstable from W coefficient control 31, which is generally de-asserted when a stability measure $\Delta(\Sigma|W_k(z)|)/\Delta t$, which is the rate of change of the sum of the coefficients of response W(z), is greater than a threshold, but alternatively, stability indication Wstable may be based on fewer than all of the W(z) coefficients that determine the response of adaptive filter 32. Further, control circuit 39 generates control signal haltW to control adaptation of W coefficient control 31 and generates control signal haltSE to control adaptation of SE coefficient control 33. Similarly, SE coefficient control 33 provides stability indication SEstable, which indicates when stability measuren $\Delta(\Sigma|SE_k(z)|)/\Delta t$ is less than a threshold, but which also may be based on fewer than all of the coefficients of SE(z). Exemplary algorithms for sequencing of the adapting of W(z) and secondary path estimate SE(z) are discussed in further detail below with reference to FIGS. 4-6.

The exemplary circuits and methods illustrated herein provide sequencing of the training of SE coefficient control 33 and then W coefficient control 31 so that SE coefficient control 33 contains proper values, and thus response $SE_{COPY}(z)$ and response SE(z) have suitable characteristics prior to adapting response W(z). The above is accomplished by permitting W coefficient control 31 to adapt only after SE coefficient control 33 has adapted, and then adaptation of SE coefficient control 33 is halted. In the example shown in FIG. 4, secondary path adaptive filter adaptation is halted by asserting control signal haltSE after the estimated response SE(z) has become stable and W(z) is allowed to adapt by de-asserting control signal haltW. In the particular operation shown in FIG. 4, response SE(z) is only allowed to adapt when response W(z) is not adapting and vice-versa, although under other circumstances or in other operating modes, responses SE(z) and W(z) can be allowed to adapt at the same time. In the particular example, response SE(z) is adapting up until time $t_0$, when either the amount of time that response SE(z) has been adapting, the assertion of indication SEstable, or other criteria indicates that response SE(z) has adapted sufficiently to estimate secondary paths S(z) and W(z) can then be adapted.

At time $t_0$, control signal halt SE is asserted and control signal haltW is de-asserted, to transition from adapting SE(z) to adapting W(z). At time $t_1$ the Source level indication provided to control circuit 39 from source audio detector 35A indicates that the downlink audio is greater than a threshold, which indicates that the leakage into reference microphone r will likely be too great for proper operation of the ANC system. The threshold may be determined from the amplitude of the reference channel provided from ambient audio detector 35B as indication Ambient level. Alternatively, the value of indication Source level may be scaled by the value of indication Ambient level in order to estimate the impact of source audio leakage into reference microphone signal ref. In response, control signal haltW is asserted to halt the adaptation of response W(z). Control signal halt SE is then de-asserted, since a strong (non-tone) downlink audio signal is generally a good training signal for response SE(z), although an upper threshold may also be applied to the Source level indication that will prevent adaptation of response SE(z) as well, if the downlink audio is so strong as to cause non-linear behavior of the ANC system. At time $t_2$, the level indication has decreased below the threshold and response W(z) is again permitted to adapt for a short period of time, by de-asserting control signal haltW and adaptation of response SE(z) is halted by asserting control signal haltSE. At time $t_3$, response W(z) is permitted to adapt for a maximum period of time, due to the amount of time response SE(z) has been cumulatively adapting crossing a threshold, or due to a stability criteria applied to the coefficients of response SE(z) or another rule that indicates that response SE(z) is of sufficient quality that response W(z) can be applied to adapt for a maximum time period $T_{maxw}$.

The sequence of adaptation of SE(z) and W(z) continues until time $t_6$, when a remote ring tone, or other tonal signal, is detected in downlink audio d. First, control circuit 39 determines that indication Source level exceeds the threshold, and asserts control signal haltW, halting adaptation of response W(z). Response SE(z) is permitted to adapt by de-asserting control signal haltSE, but at time $t_7$, indication Ring is asserted due to source audio detector 35A determining that the source audio is predominantly a tone. At time $t_8$, the tone in the source audio has ended, but response W(z) is not allowed to adapt, since adaptation of response SE(z) must be performed with a more appropriate training signal to ensure that the ring tone has not disrupted response SE(z) during the interval from time $t_6$ to time $t_7$, and no source audio is present to adapt response SE(z) at time $t_8$. Normal operation resumes with the return of downlink speech d of sufficient amplitude at time $t_9$, with a sequence of adaptation of response SE(z) followed by adaptation of response W(z) as directed by control signals haltSE and haltW.

Figure 5:
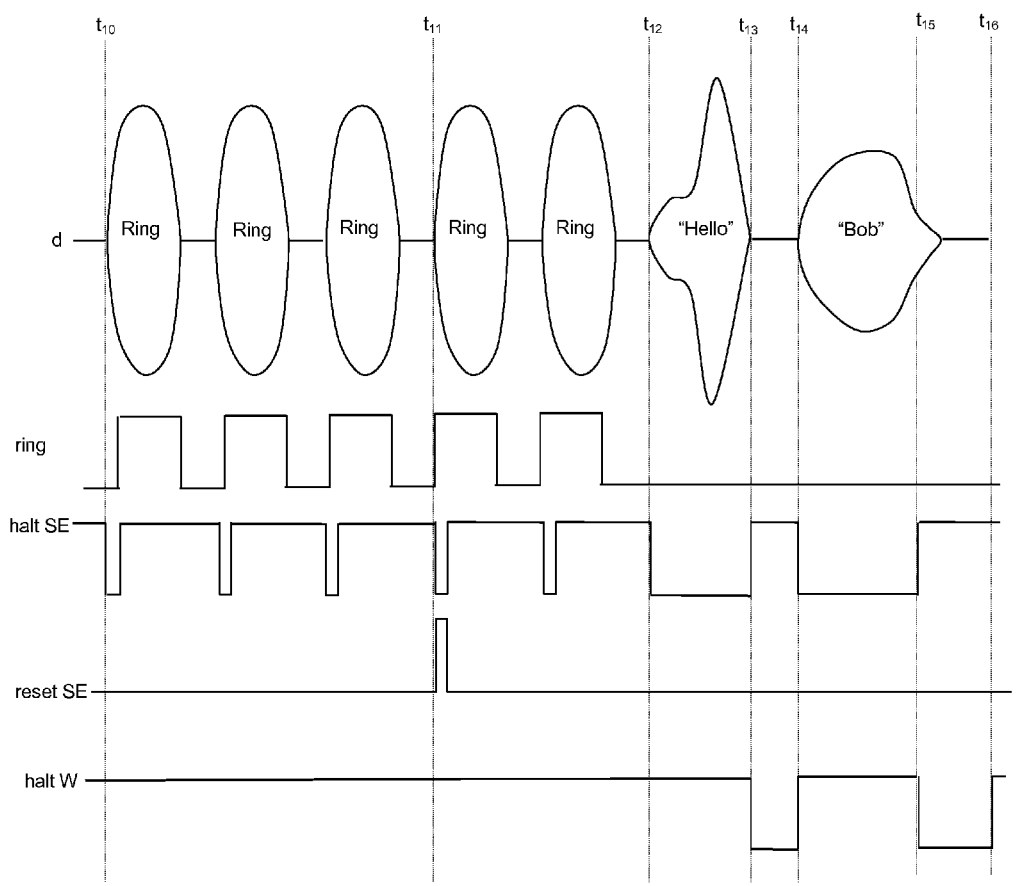

In the example shown in FIG. 5, after a number of tones are detected, secondary path adaptive filter adaptation is reset, which reduces the impact of the short adaptation periods illustrated at the beginning of each remote tone, e.g., from time $t_{10}$ until control signal haltSE is asserted. Then, as in the example of FIG. 4 after the ring tone sequence is complete, control signal haltSE is again de-asserted to adapt response SE(z) while downlink speech is present, and then control signal haltW is de-asserted while control signal halt SE is asserted to permit response W(z) to adapt to the ambient acoustic environment.

Figure 6:
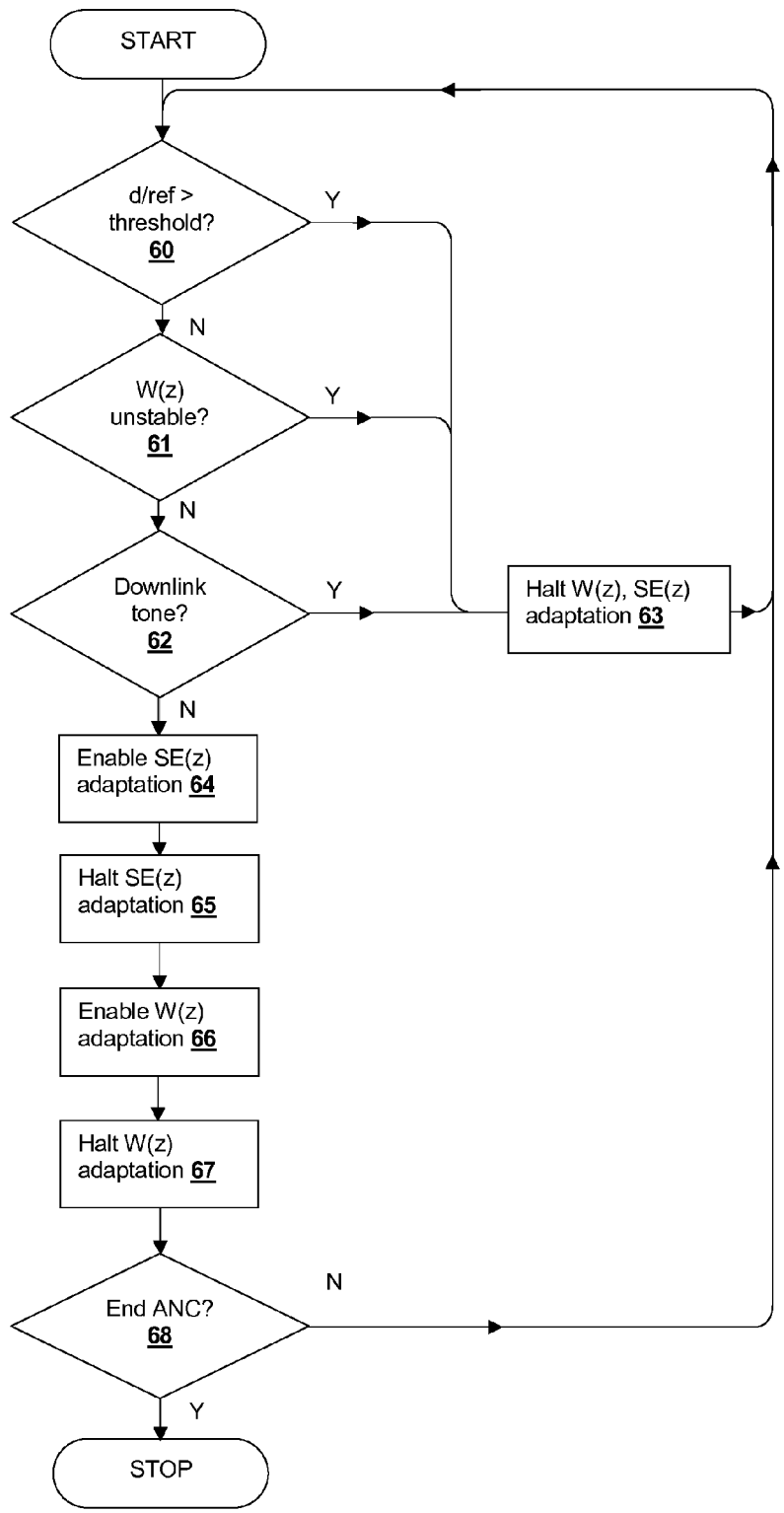
FIG. 6 is a flow chart depicting a signal processing algorithm implemented by CODEC integrated circuit 20.

FIG. 6 illustrates a method that can be implemented by control circuit 39 of FIG. 3. While an estimate of the magnitude of source audio, e.g. downlink audio d with respect to reference microphone signal ref is greater than a threshold (decision 60), or response W(z) is determined to be unstable (decision 61), e.g. if the coefficients of response W(z) are changing rapidly, or downlink audio d is a tone (decision 62), then adaptation of response W(z) and response SE(z) is halted (step 63). Otherwise, after the estimate of the magnitude of source audio, e.g. downlink audio d with respect to reference microphone signal ref is less than or equal to the threshold (decision 60), response W(z) is determined to be stable (decision 61), and downlink audio d is not a tone (decision 62), then adaptation of responses SE(z) and W(z) is sequenced. First, adaptation of response SE(z) is enabled (step 64) while adaptation of response W(z) is still disabled (step 63). Then adaptation of response SE(z) is halted (step 65), and adaptation of response W(z) is enabled (step 66). Then, adaptation of response W(z) is halted again (step 67). Until ANC generation is ended (decision 68), steps 60-67 are repeated. The flowchart of FIG. 6 is a simplified flowchart that only shows the actions of the particular mechanisms illustrated in the waveform diagrams of FIGS. 4-5 and the circuit of FIG. 3, but does not include all of the various other mechanisms that control adaptation of responses W(z) and SE(z). For example, the sequence of adaptation of steps 64-steps 67 may be repeated periodically, even if the source audio magnitude is not large and response W(z) remains stable, in order to ensure that proper adaptation is maintained.

Figure 7:
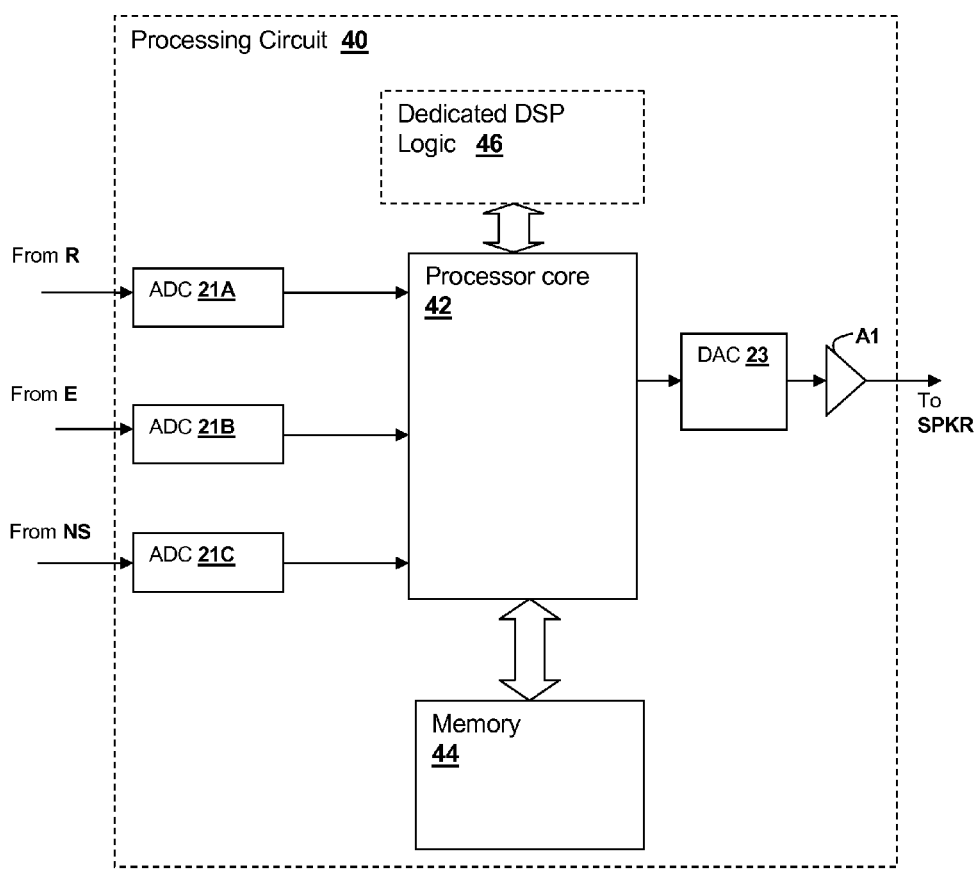
FIG. 7 is a block diagram depicting signal processing circuits and functional blocks within CODEC integrated circuit 20.

Referring now to FIG. 7, a block diagram of an ANC system is shown for implementing ANC techniques as depicted in FIG. 3, and having a processing circuit 40 as may be implemented within CODEC integrated circuit 20 of FIG. 2. Processing circuit 40 includes a processor core 42 coupled to a memory 44 in which are stored program instructions comprising a computer-program product that may implement some or all of the above-described ANC techniques, as well as other signal processing. Optionally, a dedicated digital signal processing (DSP) logic 46 may be provided to implement a portion of, or alternatively all of, the ANC signal processing provided by processing circuit 40. Processing circuit 40 also includes ADCs 21A-21C for receiving inputs from reference microphone R, error microphone E and near speech microphone NS, respectively. DAC 23 and amplifier A1 are also provided by processing circuit 40 for providing the transducer output signal, including anti-noise as described above.

While the invention has been particularly shown and described with reference to the preferred embodiments thereof, it will be understood by those skilled in the art that the foregoing, as well as other changes in form and details may be made therein without departing from the spirit and scope of the invention.

What is claimed is:

1. A personal audio device, comprising:
   a personal audio device housing;
   a transducer mounted on the housing for reproducing an audio signal including both source audio for playback to a listener and an anti-noise signal for countering effects of ambient audio sounds in an acoustic output of the transducer;
   a reference microphone mounted on the housing for providing a reference microphone signal indicative of the ambient audio sounds;
   an error microphone mounted on the housing in proximity to the transducer for providing an error microphone signal indicative of the acoustic output of the transducer and the ambient audio sounds at the transducer; and
   a processing circuit that adaptively generates the anti-noise signal from the reference signal by adapting a first adaptive filter to reduce the presence of the ambient audio sounds heard by the listener in conformity with an error signal and the reference microphone signal, wherein the processing circuit implements a secondary path adaptive filter having a secondary path response that shapes the source audio and a combiner that removes the source audio from the error microphone signal to provide the error signal, and wherein the processing circuit sequences adaptation of the secondary path adaptive filter and the first adaptive filter so that adaptation of a first one of the first adaptive filter or the secondary path adaptive filter is initiated only after adaptation of another one of the first adaptive filter or the secondary path adaptive filter is substantially completed or halted.

2. The personal audio device of claim 1, wherein the processing circuit sequences adaptation of the secondary path adaptive filter and the first adaptive filter such that adaptation of the secondary path adaptive filter is performed prior to adaptation of the first adaptive filter and while adaptation of the first adaptive filter is halted.

3. The personal audio device of claim 2, wherein the processing circuit commences a sequence of adaptation of the secondary path adaptive filter and then the first adaptive filter in response to determining that the source audio has characteristics that provide a suitable training signal for adaptation of the secondary path adaptive filter.

4. The personal audio device of claim 3, wherein the processing circuit determines that the source audio contains primarily downlink speech and therefore has characteristics that provide the suitable training signal for adaptation of the secondary path adaptive filter.

5. The personal audio device of claim 2, wherein the processing circuit commences a sequence of adaptation of the secondary path adaptive filter and then the first adaptive filter, and injects a training signal that has characteristics that provide a suitable training signal for adaptation of the secondary path adaptive filter into the source audio during adaptation of the secondary path adaptive filter.

6. The personal audio device of claim 5, wherein the training signal is a broadband signal.

7. The personal audio device of claim 2, wherein the processing circuit commences a sequence of adaptation of the secondary path adaptive filter and then the first adaptive filter in response to determining that one or more coefficients of the first adaptive filter have a rate of change that exceeds a permitted threshold.

8. The personal audio device of claim 2, wherein the processing circuit commences a sequence of adaptation of the secondary path adaptive filter and then the first adaptive filter in response to determining that a predetermined period has elapsed since a previous sequence of adaptation.

9. A method of countering effects of ambient audio sounds by a personal audio device, the method comprising:
adaptively generating the anti-noise signal from the reference signal by adapting a first adaptive filter to reduce the presence of ambient audio sounds heard by the listener in conformity with an error signal and the reference microphone signal;
combining the anti-noise signal with source audio;
providing a result of the combining to a transducer;
measuring the ambient audio sounds with a reference microphone;
measuring an acoustic output of the transducer and the ambient audio sounds with an error microphone;
implementing a secondary path adaptive filter having a secondary path response that shapes the source audio and a combiner that removes the source audio from the error microphone signal to provide the error signal; and
sequencing adaptation of the secondary path adaptive filter and the first adaptive filter so that adaptation of a first one of the first adaptive filter or the secondary path adaptive filter is initiated only after adaptation of another one of the first adaptive filter or the secondary path adaptive filter is substantially completed or halted.

10. The method of claim 9, wherein the sequencing sequences the adaptation of the secondary path adaptive filter and the first adaptive filter such that the adaptation of the secondary path adaptive filter is performed prior to adaptation of the first adaptive filter and while the adaptation of the first adaptive filter is halted.

11. The method of claim 10, further comprising:
determining whether the source audio has characteristics that provide a suitable training signal for adaptation of the secondary path adaptive filter; and
responsive to determining that the source audio has characteristics that provide a suitable training signal for adaptation of the secondary path adaptive filter, commencing a sequence of adaptation of the secondary path adaptive filter and then the first adaptive filter.

12. The method of claim 11, wherein the determining determines that the source audio contains primarily downlink speech and therefore has characteristics that provide the suitable training signal for adaptation of the secondary path adaptive filter.

13. The method of claim 10, further comprising:
commencing a sequence of adaptation of the secondary path adaptive filter and then the first adaptive filter; and
injecting a training signal that has characteristics that provide a suitable training signal for adaptation of the secondary path adaptive filter into the source audio during the adaptation of the secondary path adaptive filter.

14. The method of claim 13, wherein the training signal is a broadband signal.

15. The method of claim 10, further comprising:
determining whether one or more coefficients of the first adaptive filter have a rate of change that exceeds a permitted threshold; and
responsive to determining that the one or more coefficients of the first adaptive filter have a rate of change that exceeds the permitted threshold, commencing a sequence of the adaptation of the secondary path adaptive filter and then the first adaptive filter.

16. The method of claim 10, further comprising:
determining whether a predetermined period has elapsed since a previous sequence of adaptation; and
responsive to determining that the predetermined period has elapsed, commencing a sequence of adaptation of the secondary path adaptive filter and then the first adaptive filter.

17. An integrated circuit for implementing at least a portion of a personal audio device, comprising:
an output for providing an output signal to an output transducer including both source audio for playback to a listener and an anti-noise signal for countering the effects of ambient audio sounds in an acoustic output of the transducer;
a reference microphone input for receiving a reference microphone signal indicative of the ambient audio sounds;
an error microphone input for receiving an error microphone signal indicative of the acoustic output of the transducer and the ambient audio sounds at the transducer; and
a processing circuit that adaptively generates the anti-noise signal from the reference signal by adapting a first adaptive filter to reduce the presence of the ambient audio sounds heard by the listener in conformity with an error signal and the reference microphone signal, wherein the processing circuit implements a secondary path adaptive filter having a secondary path response that shapes the source audio and a combiner that removes the source audio from the error microphone signal to provide the error signal, and wherein the processing circuit sequences adaptation of the secondary path adaptive filter and the first adaptive filter so that adaptation of a first one of the first adaptive filter or the secondary path adaptive filter is initiated only after adaptation of another one of the first adaptive filter or the secondary path adaptive filter is substantially completed or halted.

18. The integrated circuit of claim 17, wherein the processing circuit sequences adaptation of the secondary path adaptive filter and the first adaptive filter such that adaptation of the secondary path adaptive filter is performed prior to adaptation of the first adaptive filter and while adaptation of the first adaptive filter is halted.

19. The integrated circuit of claim 18, wherein the processing circuit commences a sequence of adaptation of the secondary path adaptive filter and then the first adaptive filter in response to determining that the source audio has characteristics that provide a suitable training signal for adaptation of the secondary path adaptive filter.

20. The integrated circuit of claim 19, wherein the processing circuit determines that the source audio contains primarily downlink speech and therefore has characteristics that provide the suitable training signal for adaptation of the secondary path adaptive filter.

21. The integrated circuit of claim 18, wherein the processing circuit commences a sequence of adaptation of the secondary path adaptive filter and then the first adaptive filter, and injects a training signal that has characteristics that provide a suitable training signal for adaptation of the secondary path adaptive filter into the source audio during adaptation of the secondary path adaptive filter.

22. The integrated circuit of claim 21, wherein the training signal is a broadband signal.

23. The integrated circuit of claim 18, wherein the processing circuit commences a sequence of adaptation of the secondary path adaptive filter and then the first adaptive filter in response to determining that one or more coefficients of the first adaptive filter have a rate of change that exceeds a permitted threshold.

24. The integrated circuit of claim 18, wherein the processing circuit commences a sequence of adaptation of the secondary path adaptive filter and then the first adaptive filter in response to determining that a predetermined period has elapsed since a previous sequence of adaptation.

* * * * *